(12) United States Patent
Gebregergis et al.

(10) Patent No.: US 9,172,318 B2
(45) Date of Patent: Oct. 27, 2015

(54) METHOD AND SYSTEM TO COMPENSATE FOR DYNAMIC DC OFFSET OF MEASURED PHASE CURRENT

(71) Applicants: Abraham Gebregergis, Saginaw, MI (US); Ramakrishnan RajaVenkitasubramony, Saginaw, MI (US); Tomy Sebastian, Saginaw, MI (US)

(72) Inventors: Abraham Gebregergis, Saginaw, MI (US); Ramakrishnan RajaVenkitasubramony, Saginaw, MI (US); Tomy Sebastian, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 317 days.

(21) Appl. No.: 13/785,401

(22) Filed: Mar. 5, 2013

(65) Prior Publication Data

US 2014/0253004 A1     Sep. 11, 2014

(51) Int. Cl.
  *G05B 19/408*  (2006.01)
  *H02P 6/10*    (2006.01)
  *H02P 21/06*   (2006.01)
(52) U.S. Cl.
  CPC . *H02P 6/10* (2013.01); *H02P 21/06* (2013.01)

(58) Field of Classification Search
  USPC ............... 318/568.22, 632, 650, 71, 400.26; 701/41, 42
  See application file for complete search history.

(56) References Cited

U.S. PATENT DOCUMENTS

| | | | |
|---|---|---|---|
| 5,319,294 A * | 6/1994 | Ohto et al. | 318/568.22 |
| 5,880,570 A * | 3/1999 | Tamaki et al. | 318/700 |
| 6,060,860 A * | 5/2000 | Itoh et al. | 318/809 |
| 6,427,104 B1* | 7/2002 | Matsushita et al. | 701/41 |
| 7,772,797 B2* | 8/2010 | Sato et al. | 318/801 |
| 2004/0138837 A1* | 7/2004 | Fujii et al. | 702/64 |
| 2004/0235613 A1* | 11/2004 | Aoki et al. | 477/3 |
| 2009/0134835 A1* | 5/2009 | Welchko et al. | 318/801 |

FOREIGN PATENT DOCUMENTS

JP   2009268285 A  * 11/2009

\* cited by examiner

*Primary Examiner* — Kawing Chan
*Assistant Examiner* — Jorge L Carrasquillo
(74) *Attorney, Agent, or Firm* — Cantor Colburn LLP

(57) ABSTRACT

A motor control system for determining an offset correction value is provided. The motor control system includes a motor, an inverter, an inverter controller, and a dynamic offset compensation control module. The inverter is configured to transmit the phase current to the motor. The inverter controller determines the phase current to the motor. The dynamic offset compensation control module is in communication with the inverter controller and the motor, and is configured to perform a method at a fixed periodic interval to determine the offset correction value.

16 Claims, 2 Drawing Sheets

US 9,172,318 B2

METHOD AND SYSTEM TO COMPENSATE FOR DYNAMIC DC OFFSET OF MEASURED PHASE CURRENT

BACKGROUND OF THE INVENTION

The present invention relates to a control system for a motor, and more particularly to a control system for a motor that determines an offset correction value that accounts or compensates for a dynamic component of DC offset of measured phase current.

Permanent magnet synchronous motors (PMSM) generally have a relatively high efficiency, low inertia and a high torque-to-volume ratio. In a PMSM current controlled application, a relatively accurate measurement of phase current supplied to the PMSM is required. This is because any DC offset in the measured phase current supplied to the PMSM results in torque ripple in the output torque of the PMSM.

There are several factors that may influence the DC offset in the measured phase current. These factors include, for example, temperature variation with an analog to digital converter (ADC), temperature variation in a current amplifier, the DC offset out of the current amplifier, and the inherent offset of the ADC. There are two components of DC offset in the measured phase current, a fixed component and a variable or dynamic component. The fixed component may be accounted for using a relatively simple approach. Specifically, an offset measurement representing the fixed component of the DC offset in the measured phase current may be determined, and then incorporated into an offset correction value. However, the dynamic component may vary with time and temperature, and may not be accounted for using the same approach as the fixed component.

SUMMARY OF THE INVENTION

In one embodiment, a motor control system for determining an offset correction value is provided. The motor control system includes a motor, an inverter, an inverter controller, and a dynamic offset compensation control module. The inverter is configured to transmit the phase current to the motor. The inverter controller is configured to determine the phase current to the motor. The dynamic offset compensation control module is in communication with the inverter controller and the motor, and is configured to perform a method at a fixed periodic interval to determine the offset correction value. The method comprises disabling the inverter controller. The method also comprises measuring the phase current when the inverter controller is disabled to determine a measured phase current. The method comprises determining the offset correction value based on the measured phase current.

In another embodiment, a method of determining an offset correction value is provided. The method is performed at a fixed periodic interval to determine the offset correction value. The method comprises monitoring a motor speed and a torque reference command that is sent to a motor by a dynamic offset compensation control module. The method comprises determining if the motor speed and the torque reference command are each below respective threshold values. The method comprises disabling an inverter controller that is in communication with the dynamic offset compensation control module when the motor speed and the torque reference command are each below the respective threshold values for a predetermined amount of time. The method comprises measuring a phase current based on the inverter being disabled to determine a measured phase current. The method comprises determining the offset correction value based on the measured phase current.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
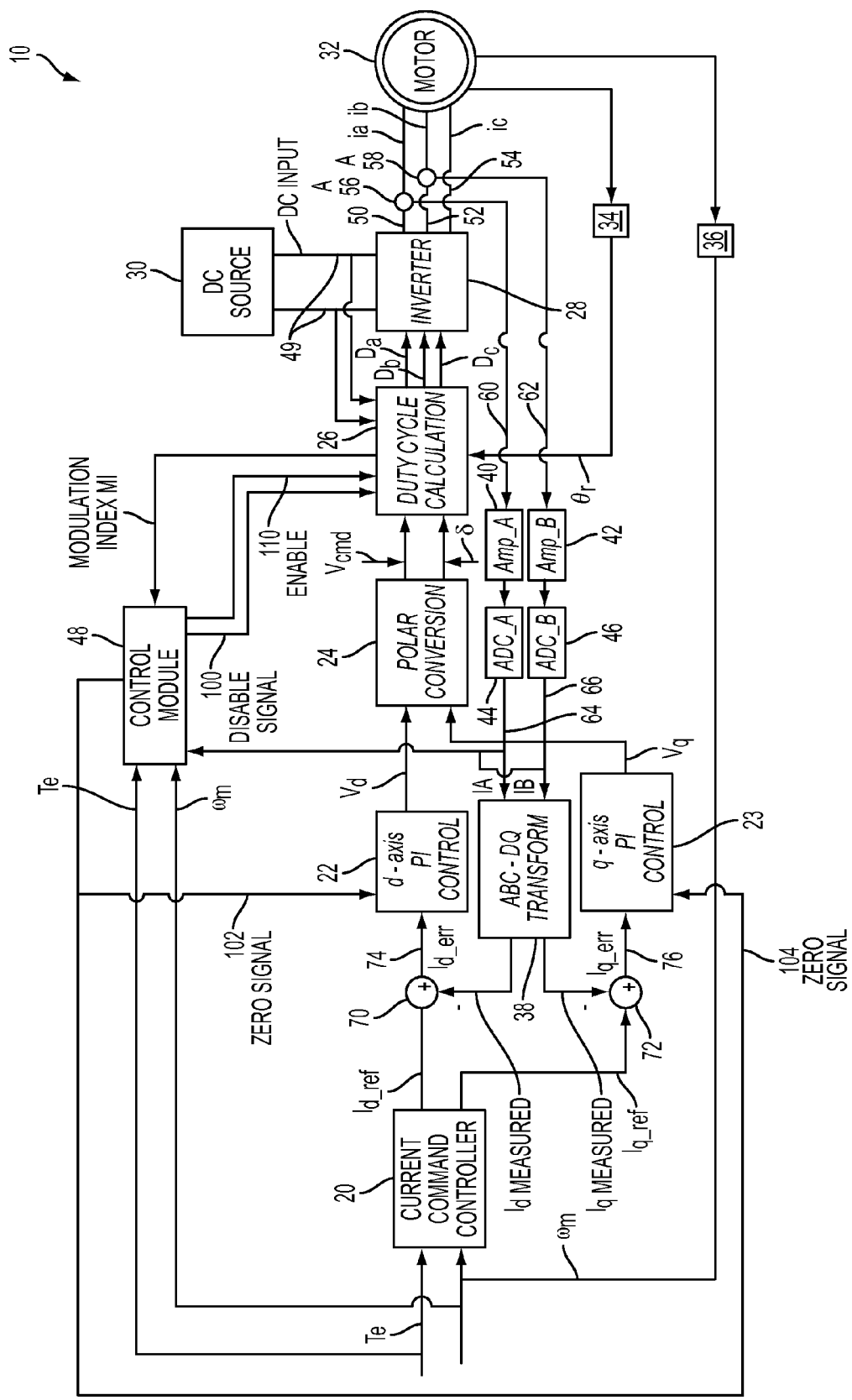
FIG. 1 is a block diagram of a motor control system in accordance with an exemplary embodiment of the invention.

Referring now to the Figures, where the invention will be described with reference to specific embodiments, without limiting same, FIG. 1 is an exemplary block diagram of a motor control system 10. The motor control system 10 includes a command current controller 20, a d-axis proportional plus integral gain (PI) controller 22, a q-axis PI controller 23, a polar conversion controller 24, a pulse width modulation (PWM) inverter controller 26, an inverter 28, a DC power source 30, a motor 32, a position sensor 34, a speed sensor 36, a transform controller 38, an a-axis current amplifier 40, a b-axis current amplifier 42, an a-axis analog to digital converter (ADC) 44, a b-axis ADC 46, and a dynamic offset compensation dynamic offset compensation control module 48. In one embodiment, the motor 32 may be a permanent magnet synchronous motor (PMSM), however it is to be understood that any type of electric motor that is controlled using phase current may be used as well.

In the embodiment as shown in FIG. 1, the inverter 28 is connected to the DC power source 30, where the DC power source 30 may be, for example, a battery. The DC power source 30 may be connected to the PWM inverter controller 26 and the inverter 28 by DC input lines 49. In the exemplary embodiment as shown, the inverter 26 transmits three alternating current (AC) phase currents to the motor 32 (e.g., $i_a$, $i_b$, and $i_c$) by line 50, line 52, and line 54 for operation and control of the motor 32.

For feedback control purposes, the phase currents $i_a$ and $i_b$ transmitted to the motor 32 by lines 50 and 52 may be detected to determine the instantaneous current flow to the motor 32. Specifically, a transducer 56 may be used to monitor the phase current $i_a$ on the line 50, and a transducer 58 may be used to monitor the phase current $i_b$ on the line 52. A control signal 60 representing the measured phase current $i_a$ may be sent to the a-axis current amplifier 40 from the transducer 56, and a control signal 62 representing the measured phase current $i_b$ may be sent to the b-axis current amplifier 42 from the transducer 58. An augmented or amplified value of the phase current $i_a$ is then sent to the a-axis ADC 44 from the a-axis current amplifier 40, and an amplified value of the phase current $i_b$ 62 is sent to the b-axis ADC 46 from the b-axis current amplifier 42. The a-axis ADC 44 converts the amplified value of the phase current $i_a$ into a digital value 64. The digital value 64 represent the magnitude of the amplified value of the phase current $i_a$. The b-axis ADC 46 converts the amplified value of the phase current $i_b$ into a digital value 66. The digital value 66 represents the magnitude of the amplified value of the phase current $i_b$.

The transform controller 38 receives as input the digital value 64 from the ADC 44 and the digital value 66 from the ADC 46. In one embodiment, the transform controller 38 is a three-phase to two-phase transformation controller where measured values for the AC current (e.g., the digital value 64 representing the phase current $i_a$ and the digital value 66 representing the phase current $i_b$) are converted into equivalent measured DC current components, which are a measured d-axis current $I_{dMEASURED}$ and a measured q-axis current $I_{qMEASURED}$. The measured d-axis current $I_{dMEASURED}$ is sent to a subtractor 70 and the measured q-axis current $I_{qMEASURED}$ is sent to a subtractor 72.

The command current controller 20 receives as input a torque reference command $T_e$ and an angular speed $\omega_m$. The torque reference command $T_e$ represents a commanded torque value, and may be derived from another controller (not shown), or may correspond to a torque value generated by an operator. The angular speed $\omega_m$ is measured by the speed sensor 36. The speed sensor 36 may include, for example, an encoder and a speed calculation circuit for calculating the angular speed of a rotor (not shown) of the motor 32 based on a signal received by the encoder. The command current controller 20 calculates a reference d-axis current $I_{d\_REF}$ and a reference q-axis current $I_{q\_REF}$ based on the torque command $T_{cmd}$ and the angular speed $\omega_m$. For example, in one embodiment, the reference d-axis current $I_{d\_REF}$ and the reference q-axis current $I_{q\_REF}$ may be calculated using a look-up table. The reference d-axis current $I_{d\_REF}$ is sent to the subtractor 70, and the reference q-axis current $I_{q\_REF}$ is sent to the subtractor 72.

The subtractor 70 receives the measured d-axis current $I_{dMEASURED}$ and the reference d-axis current $I_{d\_REF}$. The subtractor 70 determines a d-axis error signal 74 based on the measured d-axis current $I_{dMEASURED}$ and the reference d-axis current $I_{d\_REF}$. The d-axis error signal 74 represents the error between the measured d-axis current $I_{dMEASURED}$ and the reference d-axis current $I_{d\_REF}$. The subtractor 72 receives the measured q-axis current $I_{qMEASURED}$ and the reference q-axis current $I_{q\_REF}$. The subtractor 72 determines a q-axis error signal 76 based on the measured q-axis current $I_{qMEASURED}$ and the reference q-axis current $I_{q\_REF}$. The q-axis error signal 76 represents the error between the measured q-axis current $I_{qMEASURED}$ and the reference q-axis current $I_{q\_REF}$.

The d-axis PI controller 22 receives as input the d-axis error signal 74 from the subtractor 70. The d-axis PI controller 22 calculates a d-axis voltage signal $V_D$. The d-axis voltage signal $V_D$ is based on a d-axis proportional gain $K_P$, a d-axis integral gain $K_i$, and a d-axis integral voltage. Likewise, the q-axis PI controller 23 receives as input the q-axis error signal 76 from the subtractor 72. The q-axis PI controller 23 calculates a q-axis voltage signal $V_Q$. The q-axis voltage signal $V_Q$ is based on a q-axis proportional gain $K_P$, a q-axis integral gain $K_i$, and a q-axis integral voltage.

The polar conversion controller 24 receives as input the d-axis voltage signal $V_D$ from the d-axis PI controller 22 and the q-axis voltage signal $V_Q$ from the q-axis PI controller 23. Based on the inputs, the polar conversion controller 24 determines a voltage command $V_{cmd}$ and a phase advance angle $\delta$. The PWM inverter controller 26 receives as inputs the voltage command $V_{cmd}$ and the phase advance angle $\delta$ from the polar conversion controller 24. The PWM inverter controller 26 also receives a rotor angle value $\theta_r$ measured by the motor position sensor 34. In one exemplary embodiment, the PWM inverter controller 26 may include an over-modulation space vector PWM unit to generate three respective duty cycle values $D_a$, $D_b$, and $D_c$. The duty cycle values $D_a$, $D_b$, and $D_c$ are used to drive gate drive circuits (not shown) of the inverter 28 that energize phases of the of the motor 32. A modulation index MI is determined by the PWM inverter controller 26. The modulation index MI is used to generate the motor duty cycle commands $D_a$, $D_b$, and $D_c$, and is proportional to the current phase currents $i_a$, $i_b$, and $i_c$ that are applied to the motor 32. The modulation index MI may be calculated by dividing the voltage command $V_{cmd}$ by the DC source voltage (e.g., MI=$V_{cmd}$/DC source voltage).

The dynamic offset compensation control module 48 determines an offset correction value that is based on a variable or dynamic component of DC offset of measured phase current supplied to the motor 32. Specifically, the offset correction value may be used to compensate or account for the dynamic component of DC offset of the measured phase current. The dynamic component of the DC offset of the measured phase current may vary based on time and temperature. In the exemplary embodiment as discussed, the measured phase current may be the output of the a-axis ADC 44 (the digital value 64) and the output of the b-axis ADC 46 (digital value 66). The dynamic offset compensation control module 48 may perform a method or compensation technique to determine the offset correction value at a fixed periodic interval $T_m$. In one embodiment, the fixed periodic interval $T_m$ may be about 1 second, however the fixed periodic interval $T_m$ may be other lengths of time as well (e.g., every several seconds). However, before the offset correction value may be calculated, the motor current should be about zero, which may be done by disabling the PWM inverter controller 26 for a predetermined amount of time.

The PWM inverter controller 26 may be disabled only if the motor 32 is not being utilized for a specific operation. For example, if the motor 32 is part of an electric power steering (EPS) system, then the PWM inverter controller 26 may only be disabled if a steering maneuver is not being performed. Thus, the dynamic offset compensation control module 48 determines a region of operation where the PWM inverter controller 26 may be disabled by monitoring the torque reference command $T_e$ and the angular speed $\omega_m$ of the motor 32. In one embodiment, the region of operation where the PWM inverter controller 26 may be disabled is further based on monitoring the modulation index MI. In one embodiment, the torque reference command $T_e$ is assumed to be zero if the torque reference command $T_e$ is below a threshold torque value. In one example, the threshold torque value may be about 1 mN. Likewise, the angular speed $\omega_m$ is assumed to be zero if the angular speed $\omega_m$ is below a threshold speed value. In one example, the threshold speed value may be about 1 rad/sec. The applied modulation index is assumed to be zero if the applied modulation index is below a threshold modulation value. In one example, the threshold modulation value may be about 0.002.

In one embodiment, the torque reference command $T_e$, the angular speed $\omega_m$, and the applied modulation index may be monitored by the dynamic offset compensation control module 48 periodically (e.g., about every few seconds). If the torque reference command $T_e$ is below the threshold torque value, the angular speed $\omega_m$ is below the threshold speed value, and if the threshold speed value is below the threshold modulation value for a predetermined number of cycles or sample times, then the PWM inverter controller 26 is disabled. In one embodiment, the predetermined number of cycles is 5 cycles, however it is to be understood that other values may be used as well.

The PWM inverter controller 26 may be disabled by sending a disable signal 100 generated by the dynamic offset compensation control module 48 to the PWM inverter controller 26. In addition to disabling the PWM inverter controller 26, the d-axis proportional gain $K_P$, the d-axis integral gain $K_i$, and the d-axis integral voltage of the d-axis PI controller 22 are set to zero by sending a zero signal 102 from the dynamic offset compensation control module 48. Likewise, the q-axis proportional gain $K_P$, the q-axis integral gain $K_i$, and the q-axis integral voltage of the q-axis PI controller 23 are each set to zero by sending a zero signal 104 from the dynamic offset compensation control module 48. This generally ensures that the d-axis PI controller 22 and the q-axis PI controller 23 do not accumulate error as the dynamic offset compensation control module 48 determines the offset correction value.

Once the PWM inverter controller 26 is disabled and the d-axis proportional gain $K_P$, the d-axis integral gain $K_i$, and the d-axis integral gain of the d-axis PI controller 22 and the q-axis proportional gain $K_P$, the q-axis integral gain $K_i$, and the q-axis integral gain of the q-axis PI controller 23 are each set to zero, the dynamic offset compensation control module 48 may measure the motor current after a predetermined amount of time has lapsed (e.g., in one approach, the predetermined amount of time is six PWM cycles). Specifically, the dynamic offset compensation control module 48 may measure the current supplied to the motor 32 by monitoring the a-axis ADC 44 for the digital value 64 and the b-axis ADC 46 for the digital value 66. The dynamic offset compensation control module 48 may then continue to monitor the motor current for a fixed number of cycles to collect multiple current readings. In one exemplary approach, the dynamic offset compensation control module 48 monitors the motor current for four cycles every PWM clock cycle to obtain four current readings (where the PWM clock cycle is about 62.5 microseconds). Once the dynamic offset compensation control module 48 has collected the multiple current readings, the dynamic offset compensation control module 48 may then send an enable signal 110 to the PWM inverter controller 26 to resume operation.

The dynamic offset compensation control module 48 determines an average value A of the multiple current readings. The average value A is then compared to an initial offset value. This comparison is performed in order to ensure that the average value A is within a specific tolerance range. In one embodiment, the specific tolerance range is about 70 milliamps. If the average value A is within the specific tolerance range, then the offset correction value is determined. The offset correction value may be based on the average value A, as well as a present offset correction value P. In one exemplary embodiment, the offset correction value is determined by the following equation:

Offset correction value=50% of the present offset correction value $P$+50% of the average value $A$ It should be noted that while the offset correction value of based on 50% of the present offset correction value P and 50% of the average value A, other approaches may be used as well to determine the offset correction value. The offset correction value is based on both the present offset value P and the average value A in order to substantially prevent a rapid change in the offset values of the motor control system 10.

Figure 2:
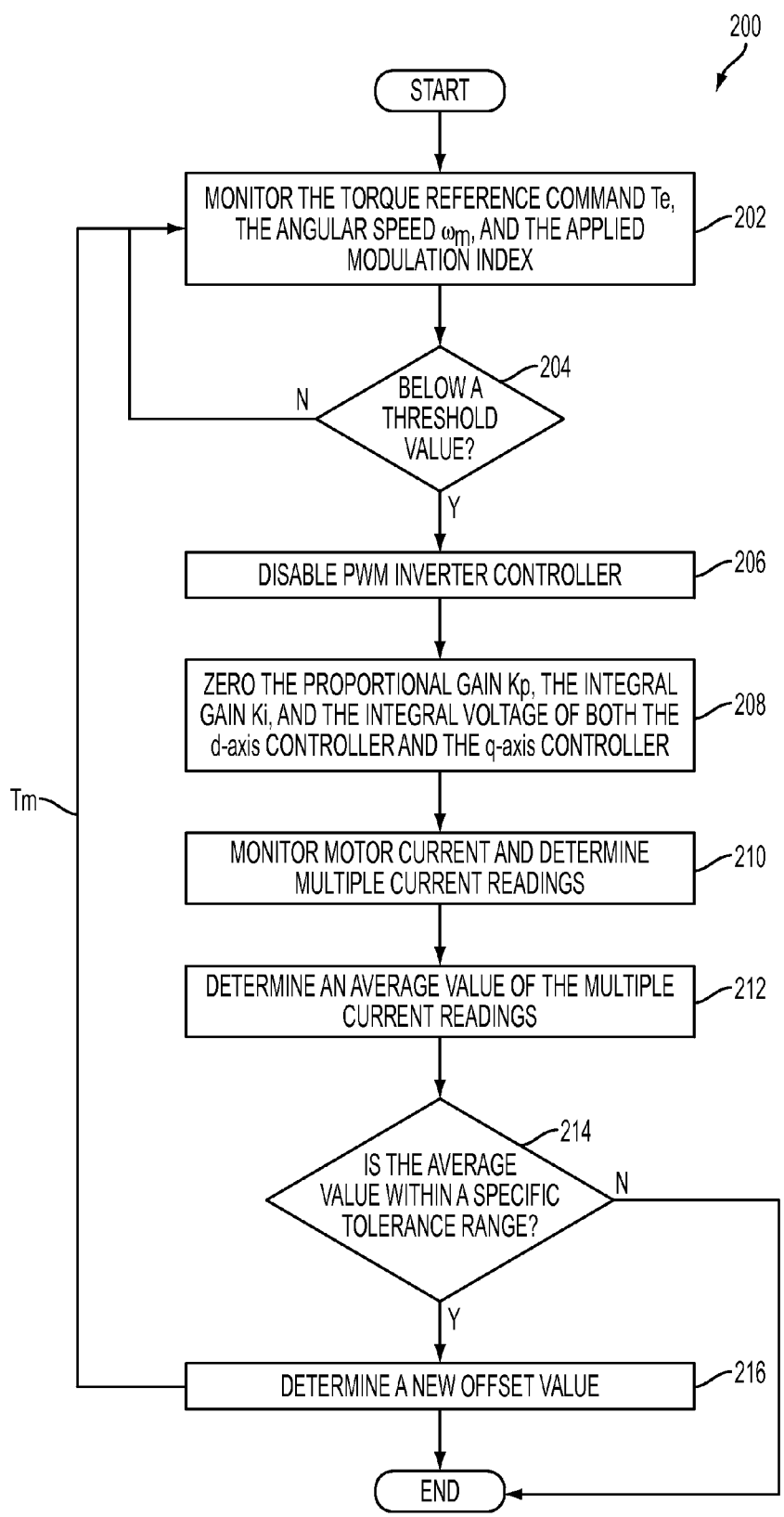
FIG. 2 is a process flow diagram for determining a dynamic DC offset in accordance with another exemplary embodiment of the invention.

FIG. 2 is an exemplary process flow diagram illustrating a method 200 for determining the offset correction value. Referring now to both FIGS. 1-2, the method 200 may begin at block 202, where the dynamic offset compensation control module 48 monitors the torque reference command $T_e$, the angular speed $\omega_m$, and the applied modulation index periodically (e.g., every 2 milliseconds). Method 200 may then proceed to block 204.

In block 204, the dynamic offset compensation control module 48 determines if the torque reference command $T_e$ is below the threshold torque value, the angular speed $\omega_m$ is below the threshold speed value, and if the threshold speed value is below the threshold modulation value for a predetermined number of cycles or sample times (e.g., 5 cycles). If the answer is no, method 200 may return to block 202. If the answer is yes, method 200 may then proceed to block 206.

In block 206, the PWM controller 26 is disabled by the disable signal 100 sent from the dynamic offset compensation control module 48. Method 200 may then proceed to block 208.

In block 208, the d-axis proportional gain $K_P$, the d-axis integral gain $K_i$, and the d-axis integral voltage of the d-axis PI controller 22 are set to zero by sending the zero signal 102 from the dynamic offset compensation control module 48. Likewise, the q-axis proportional gain $K_P$, the q-axis integral gain $K_i$, and the q-axis integral voltage of the q-axis PI controller 23 are each set to zero by sending a zero signal 104 from the dynamic offset compensation control module 48. Method 200 may then proceed to block 210.

In block 210, the dynamic offset compensation control module 48 measures the motor current. The dynamic offset compensation control module 48 may measure the motor current by monitoring the a-axis ADC 44 for the digital value 64 and the b-axis ADC 46 for the digital value 66. Specifically, the dynamic offset compensation control module 48 may monitor the motor current for a fixed number of cycles (e.g., four cycles every PWM clock cycle to obtain four current readings) to collect multiple current readings. Method 200 may then proceed to block 212.

In block 212, the dynamic offset compensation control module 48 determines the average value A of the multiple current readings. Method 200 may then proceed to block 214.

In block 214, the average value A is compared to the initial offset value to determine if the average value A is within the specific tolerance range. If the average value A is not within the specific tolerance range, method 200 may then terminate. However, if the average value A is within the specific tolerance range, then method 200 may proceed to block 216.

In block 216, the offset correction value is determined. The offset correction value may be based on the average value A, as well as a present offset correction value P. Once the offset correction value is determined, method 200 may wait the fixed periodic interval $T_m$, and then return to block 202.

The dynamic offset compensation control module 48 as described above provides a method that determines the offset correction value, where the method is performed at the fixed periodic interval $T_m$. The offset correction value accounts for the dynamic component of the DC offset in the measured phase current. The fixed component of DC offset in the measured phase current may be accounted for relatively easily, as the fixed component remains generally constant over time. However, these approaches may not be used to account for the dynamic component of DC offset in the measured phase current, as the dynamic component may vary with time and temperature. Also, the dynamic component of DC offset in the measured phase current may be non-linear. Thus, some types of motor control systems currently available may not be able to account for the dynamic DC offset in the measured phase current.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A motor control system for determining an offset correction value, comprising:
    a motor;
    an inverter configured to transmit a phase current to the motor;
    an inverter controller configured to determine the phase current to the motor; and
    a dynamic offset compensation control module in communication with the inverter controller and the motor, the dynamic offset compensation control module configured to perform a method at a fixed periodic interval to determine the offset correction value, the method comprising:
        disabling the inverter controller;
        measuring the phase current when the inverter controller is disabled to determine a measured phase current, the measuring performed for multiple current readings that are collected over a fixed number of cycles;
        determining an average value of the multiple current readings;
        comparing the average value to an initial offset value to determine if the average value is within a specific tolerance range; and
        determining the offset correction value based on the measured phase current.

2. The motor control system of claim 1, wherein the dynamic offset compensation control module monitors a motor speed and a torque reference command, and determines if the motor speed and the torque reference command are each below threshold values.

3. The motor control system of claim 2, wherein the dynamic offset compensation control module disables the inverter controller based on the motor speed and the torque reference command each being below the respective threshold values.

4. The motor control system of claim 1, wherein disabling the inverter controller is further based on a modulation index of the inverter controller, wherein the inverter controller is disabled based on the modulation index being below a modulation index threshold value.

5. The motor control system of claim 1, further comprising at least one proportional plus integral gain (PI) controller, wherein a proportional gain $K_P$, an integral gain $K_i$, and an integral voltage of the at least one PI controller are each set to zero when the inverter controller is disabled.

6. The motor control system of claim 1, wherein the offset correction value is based on the average value and a present offset correction value.

7. The motor control system of claim 6, wherein the offset correction value is determined by:

offset correction value=50% of the present offset correction value+50% of the average value.

8. The motor control system of claim 1, wherein the motor is a permanent magnet synchronous motor (PMSM).

9. The motor control system of claim 1, wherein the measured phase current is an output of at least one analog to digital converter (ADC).

10. The motor control system of claim 1, further comprising sending an enable signal to the inverter controller based on the dynamic offset compensation control module measuring the phase current, the enable signal configured to resume operation of the inverter controller.

11. The motor control system of claim 1, wherein the dynamic offset compensation control module monitors a motor speed and a torque reference command periodically, and wherein the inverter controller is disabled based on the motor speed and the torque reference command each being below respective threshold values for a predetermined number of cycles.

12. A method of determining an offset correction value, the method performed at a fixed periodic interval to determine the offset correction value, the method comprising:
    monitoring a motor speed and a torque reference command that is sent to a motor by a dynamic offset compensation control module;
    determining if the motor speed and the torque reference command are each below respective threshold values;
    disabling an inverter controller that is in communication with the dynamic offset compensation control module when the motor speed and the torque reference command are each below the respective threshold values for a predetermined amount of time;
    measuring a phase current when the inverter is disabled to determine a measured phase current, the measuring performed for multiple current readings that are collected over a fixed number of cycles;
    determining an average value of the multiple current readings;
    comparing the average value to an initial offset value to determine if the average value is within a specific tolerance range; and
    determining the offset correction value based on the measured phase current.

13. The method of claim 12, wherein disabling the inverter controller is further based on a modulation index of the inverter controller, wherein the inverter controller is disabled based on the modulation index being below a modulation index threshold value.

14. The method of claim 12, further comprising at least one proportional plus integral gain (PI) controller, wherein a proportional gain $K_P$, an integral gain $K_i$, and the an integral voltage of the at least one PI controller are each set to zero if the inverter controller is disabled.

15. The method of claim 12, wherein an average value of the multiple current readings is determined and compared to an initial offset value to determine if the average value is within a specific tolerance range.

16. The method of claim 15, wherein the offset correction value is based on the average value and a present offset correction value.

* * * * *